United States Patent [19]
Hasenwinkle

[11] 3,989,078
[45] Nov. 2, 1976

[54] LOG CUTTING AND REJOINING PROCESS

[75] Inventor: Earl Dean Hasenwinkle, Longview, Wash.

[73] Assignee: Weyerhaeuser Company, Tacoma, Wash.

[22] Filed: Jan. 7, 1976

[21] Appl. No.: 647,032

[52] U.S. Cl. .......... 144/316; 144/309 L; 144/314 R; 156/264

[51] Int. Cl.² .......... B32B 3/14; B27D 1/00

[58] Field of Search .......... 144/309 L, 313, 314 R, 144/314 B, 315 R, 316, 321, 326 R; 156/264

[56] References Cited

UNITED STATES PATENTS 2,544,935 3/1951 Orner .......... 144/316

FOREIGN PATENTS OR APPLICATIONS 183,513 4/1936 Switzerland .......... 144/316 R
781,627 8/1957 United Kingdom .......... 144/315 R

*Primary Examiner*—Othell M. Simpson
*Assistant Examiner*—W. D. Bray

[57] ABSTRACT

A process for making composite lumber products from generally cylindrical logs includes the steps of cutting a log radially into a plurality of first sector-shaped pieces and then cutting from the sector-shaped pieces at least two members where the cutting plane is substantially perpendicular to one of the radial faces of the sector-shaped pieces. Then one resulting smaller sector-shaped piece is reversed with respect to a resulting quadrilaterally-shaped piece and the two pieces having a substantially similar width dimension are adhesively bonded together. The composite members thusly formed are then machined into a desired shape or additional joining steps can be performed to increase dimensional size. Thus from a cylindrical log composite lumber is produced resulting in improved lumber yield.

6 Claims, 6 Drawing Figures

LOG CUTTING AND REJOINING PROCESS

BACKGROUND OF THE INVENTION

This invention relates generally to a new process for converting round logs into lumber products, primarily dimension lumber. More particularly, it relates to a log cutting and subsequent rejoining process for converting logs to lumber products whereby the yield of lumber from the wood volume is substantially increased. In the commonly assigned U.S. Pat. Nos. 3,903,943 and 3,961,654 two cutting and rejoining processes are disclosed that can be utilized for increasing the lumber yield of logs which include certain of the steps employed in the cutting and rejoining process of the present invention. The disclosures in the above-noted issued U.S. Pats. are incorporated herein by reference for purposes of providing a complete description of the present invention.

The centuries-old conversion process of sawing logs into rectangular lumber results in a low yield in that, of the total volume of wood in a log, usually less than half is or can be converted into usable lumber. This is primarily because of the constraint that only square or rectangular pieces are cut from a cylindrical log. The actual lumber yields utilizing known processes, of course, vary depending upon a number of factors, such as log diameter, but even with the best available computer-controlled sawing machines a normal yield of lumber from a log is 60%–70% of the total wood volume and with small diameter logs much less. The term "lumber" is intended to mean those wood products traditionally having the highest marketable value that are derivable on a longitudinal sawing basis from a log and which are generally rectangular in cross-section.

The most commonly used large log-to-lumber converting process is that where saws make a plurality of longitudinal cuts through the log with each successive cut generally being in a plane parallel or perpendicular to the previous cut. With this process, it is obvious that there are yield limitations simply from the fact that the beginning raw material is cylindrical while the desired final lumber product is rectangular in nature. The wood volume not converted into lumber is utilized in a variety of other ways, none of which offer the value of a lumber product. The sawdust can be used as fuel, particleboard and the like. The solid wood slabs and edgings can be chipped into small pieces suitable for wood pulp production or likewise they can be used for fuel.

In the past, there have been many suggestions of ways to increase the recovery of solid wood products that could be converted from a log. Veneer production and subsequent laminating methods has been one suggestion. In veneer production the cylindrical log is converted into pieces of wood veneer which can then be laminated together to form various wood products. Such composite products and their converting processes do convert more of the wood volume into generally solid wood products, but they do not generally have the market acceptance or characteristics of lumber.

The aforementioned U.S. Pat. No. 3,961,654 discloses a process and resulting product that can be employed to greatly increase the yield of lumber from cylindrically-shaped logs. The process as disclosed is generally for logs of small diameter such as from 5 to 15 inches in diameter. It became apparent when considering larger diameter logs that cutting sector-shaped pieces according to the small log process would present difficult handling problems. For example, when cutting the larger diameter logs into sectors where the final lumber product was to have a nominal thickness of 1½ inch, the sector angle would be relatively small and a large number of thin sectors would result which would be difficult to handle according to the process. Thus, the process of U.S. Pat. No. 3,903,943 was conceived to handle larger logs.

Yet another alternative process was conceived as following from cutting logs into sector-shaped pieces. The cutting and rejoining process of the present invention results in composite pieces which can then be machined into final shapes or machined for edge bonding into wider widths. It is anticipated that the resulting composite pieces of lumber will have a high value and will be generally accepted in the marketplace.

The composite pieces of lumber produced by the present process will have a substantially vertical grain pattern over their wide dimension. Thus, the resulting lumber products will have all the benefits and characteristics associated with typical vertical grain lumber, such as improved drying characteristics, better stability, and the like.

Accordingly, from the foregoing, one object of the present invention is to provide a process that will convert generally cylindrical logs into composite lumber products in which the percentage of log volume that is converted to lumber products is substantially increased.

A further object is to provide a lumber cutting and rejoining process that produces substantially all vertically grained lumber.

These and other objects will become more apparent and better understood upon reading the following specification in conjunction with the attached drawing.

SUMMARY OF THE INVENTION

Briefly, this invention is practiced in one form by longitudinally cutting a log segment radially into a plurality of first sector-shaped pieces. Each of the sector-shaped pieces then has one smaller sector-shaped piece and at least one quadrilaterally-shaped piece cut therefrom having the cutting plane substantially perpendicular to one of the cut radial faces of the first sector-shaped piece. One smaller second sector-shaped piece and one quadrilaterally-shaped piece are then accumulated and bonded together such that an elongated trapezoid is formed. The composite piece can be edged and surfaced in any suitable manner. In order to form lumber of wider dimension, a plurality of the resulting smaller composite pieces may be edge bonded together.

DESCRIPTON OF THE DRAWING

DESCRIPTION OF THE PREFERRED EMBODIMENT

Figure 1:
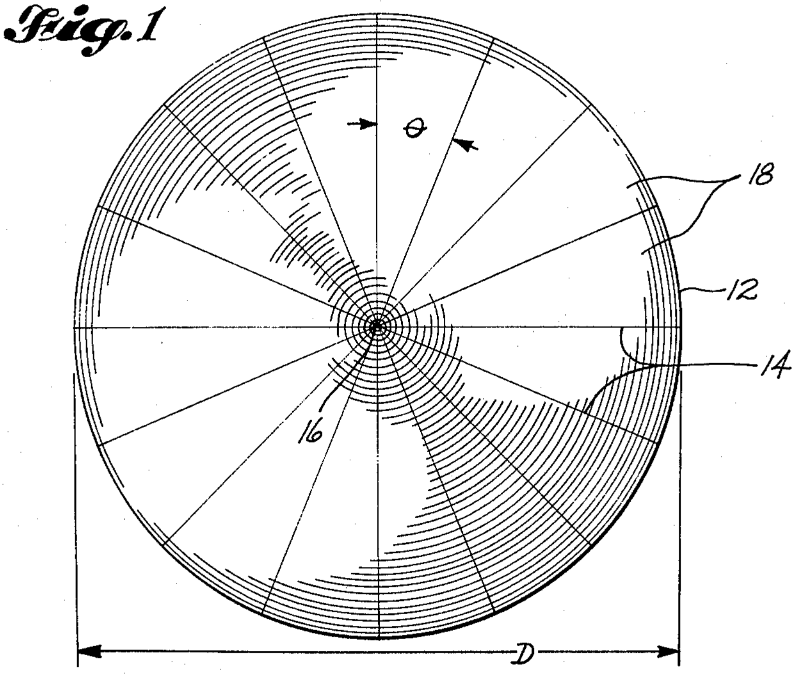
FIG. 1 is an end view of a log depicting a radial cutting pattern.

Depicted in FIG. 1 is an end view of a typical generally cylindrically-shaped longitudinally extending log 12. Log segment 12 is typical in that it has been cross-cut to a suitable length for further processing and has preferably been debarked prior to the further processing. For example, in a typical stud mill operation, the standard length of log segment 12 would be approximately 8 feet 6 inches with each of the segments 12 then being longitudinally cut into a plurality of typical 2×4 pieces of lumber. Superimposed over the end view of log segment 12 are a plurality of radial cutting planes depicted as 14 with each cutting plane 14 essentially passing through the center 16 of log segment 12.

The first decision that must be made with a given log segment is what the sector cutting pattern should be. For ease of cutting, the pattern selected should produce an even number of sector-shaped or first pieces each indicated as 18. Each sector piece 18 has several given parameters depending on the selected number of cuts to be made for a particular log segment 12. For example, sixteen cuts are indicated which will result in sixteen individual sector-shaped pieces 18. With the given number of cuts at sixteen, the angle $\theta$ of each sector-shaped piece 18 will be equal to 22.5°. Another given parameter is the desired thickness of the final composite lumber product. Here, for example, assume it is desired to produce a finished dimensional product having a nominal thickness of 1.50 inches in a dry surfaced condition, then the diameter of the log segment 12 required can be calculated by using the following equation:

$$D = \frac{2T}{\sin \theta} \qquad (1)$$

where $T$ is the thickness of a first sector-shaped piece in the green unsurfaced condition;

$\theta$ is the included angle of the first sector-shaped pieces between radial faces when cut from the log segment and which will be less than 90°, and D is the diameter of the log segment.

A simple table could be prepared similar to those in U.S. Pat. Nos. 3,903,943 and 3,961,654 in solving for log diameters when the angle $\theta$ is known for a given equal number of radial cuts and for an assumed value of T. As a general rule, as will be apparent to those skilled in the art, the thickness in solving equation (1) will be the green thickness plus the kerf resulting from sawing and for a nominal 1.50 inches finished product will be assumed to be 1.76 inches which should be taken by way of example only with the 0.26 inches (that amount over the 1.50 inches final thickness) as a reasonable estimate of a normal allowance for cutting, drying, and surfacing losses.

At this point in the process a plurality of first sector-shaped pieces 18 are available for further processing. In normal lumber manufacturing processes the pieces would now be dried if a further adhesive bonding step was to be employed. In the process of U.S. Pat. No. 3,961,654 the sector-shaped pieces would be dried to a suitable moisture content prior to adhesively bonding them together, thin edge to thick edge. Similarly, in the process of U.S. Pat. No. 3,903,943, with the exception of the resulting trapezoidally-shaped pieces.

Figure 2:
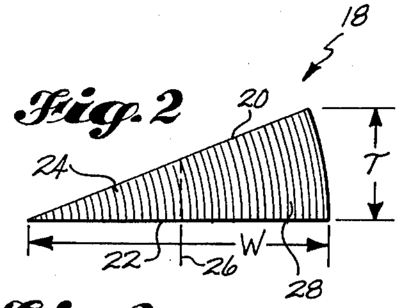
FIG. 2 is an end view showing the cutting plane for yielding one smaller sized sector and one larger quadrilaterally-shaped piece.

In the present process another cutting step is to be performed. An individual first sector-shaped piece 18, as depicted in FIG. 2, will have a pair of radial faces 20, 22 meeting at an apex between which is included angle $\theta$. Since log segment 12 was cut to yield a sector-shaped piece having a predetermined thickness dimension the width dimension (W) will be some resulting value. In order to produce a composite piece of lumber from a single sector-shaped piece 18 a second smaller sector-shaped piece 24 can be cut from the first larger piece 18. As depicited in FIG. 2 a cutting plane 26 is passed through the first piece 18 longitudinally at a distance from the apex that is approximately one-half the width dimension. The cutting plane 26 is substantially perpendicular to one or the other of radial faces 20 or 22. The resulting pieces are the second smaller sector-shaped piece 24 and a larger quadrilaterally-shaped piece 28 which can then be dried to a suitable moisture content prior to adhesively bonding the pieces together.

Figure 3:
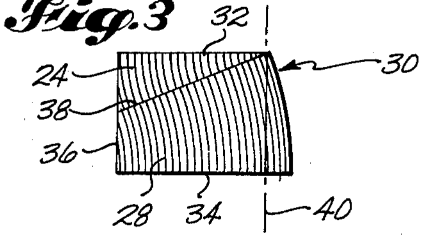
FIG. 3 is an end view showing the smaller sector-shaped piece and the quadrilaterally-shaped piece bonded together.

After the resulting pieces have been dried the two are rejoined in an adhesive bonding step. Any suitable wood adhesive may be used such as a phenol-resorcinol-formaldehyde composition. Those surfaces that will comprise the bonded surfaces may be prepared by surfacing for better bonding. As seen in FIG. 3 the second smaller sector-shaped piece 24 is rotated with respect to its prior integrated position and then placed adjacent the top surface of quadrilateral piece 28. The juxtaposed bonding surfaces of the two pieces are comprised of the divided radial face 20 after one surface is rotated with respect to the other in order to form the resulting composite trapezoidal member 30. The trapezoid so formed has top and bottom surfaces 32, 34 that are parallel together with a surface 36 that is substantially at right angles to surfaces 32, 34. Surface 36 is that composite surface comprised of the two parallel juxtaposed surfaces formed when cutting plane 26 is passed through the first larger sector-shaped piece 18. The angles that come together in forming surface 36 are in sum equal to a 180° angle. The fourth surface is comprised of the curvilinear portion of the original sector-shaped piece 18. Composite member 30 is held together by resulting glue line 38 such that all angular and surface relationships are maintained.

In order to form a final rectangular composite member the member 30 can be machined as appropriate, particularly to remove the remaining curvilinear surface. A longitudinally extending plane 40 is depicted in FIG. 3 to indicate the squaring up of composite member 30.

Figure 4:
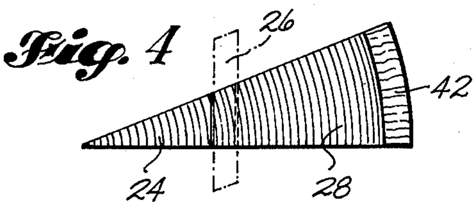
FIG. 4 is also an end view depicting a cutting pattern for capturing taper.
Figure 5:
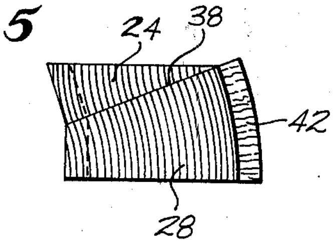
FIG. 5 is a view similar to FIG. 3 showing the pieces joined together to capture taper.
Figure 6:
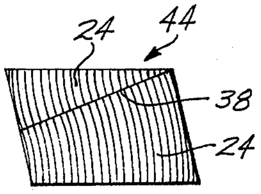
FIG. 6 is an end view of an elongated composite piece after being machined into the shape of a parallelogram.

Looking now at FIGS. 4–6, where like reference numbers represent like elements, a description will be given of the process to utilize log taper in the resulting composite piece of lumber. In FIG. 4 a longitudinally extending volume is depicted at 42 and is that portion of the log volume constituting log taper. Of course, it will be recognized by those skilled in the art that the pieces of FIGS. 2 and 3 were rounded up prior to processing in order to remove taper. In making the longitudinal cut along plane 26 it will be made at a slight angle corresponding to the taper angle with respect to the log centerline. Thus, the resulting second smaller sector-shaped piece 24 will be slightly thicker and wider at one end as will the quadrilaterally-shaped piece 28. In order to accommodate the taper volume the second smaller sector-shaped piece is then reversed longitudinally with respect to the quadrilaterally-shaped piece 28 and placed on its top surface so the top and bottom surfaces 32, 34 are substantially parallel. The composite surface corresponding to surface 36 is partially inclined and therefore must be machined to form a flat surface. The composite member 44 depicited in FIG. 6 is the final cross sectional shape after machining the composite piece of FIG. 5. The edges have been minimally machined in order to make them parallel and thereby to form a complete parallelogram. The composite member 44 can then be edge bonded together with other similar members if wider width dimensions are desired.

While a detailed description of the basic process and product has been described together with a variation to utilize taper, it is understood that other changes and modifications may be made to the basic process without departing from the spirit of the invention. All such modifications are intended to be included within the scope of the appended claims.

I claim:

1. The process for making composite lumber products from generally cylindrical logs comprising the steps of:

longitudinally cutting the logs along radial cutting planes into a plurality of first sector-shaped pieces with the resulting included angle between radial faces being less than 90°;

cutting the first pieces along at least one longitudinal plane of cut that is substantially perpendicular to one of the radial faces, thereby forming second smaller sector-shaped pieces and at least one quadrilaterally shaped piece; and accumulating one second sector-shaped piece and one quadrilaterally shaped piece of similar width dimension and adhesively bonding them together such that a trapezoidally shaped elongated composite member is formed.

2. The process as in claim 1 including the step of machining the composite member into a desired cross-sectional shape.

3. The process as in claim 2 in which the desired shape is a parallelogram.

4. The process as in claim 1 including the step of drying the second sector-shaped pieces and the quadrilaterally shaped pieces prior to bonding them together.

5. The process as in claim 2 including the step of bonding a plurality of the machined composite members together to form larger elongated composite pieces.

6. The process as in claim 1 in which the longitudinal plane of cut is made to a first piece at an angle from the log centerline to correspond with the taper angle and then, prior to bonding, longitudinally reversing the second sector-shaped piece with respect to the quadrilaterally shaped piece.

* * * * *